(12) United States Patent
Dietrich

(10) Patent No.: US 7,162,925 B2
(45) Date of Patent: Jan. 16, 2007

(54) PRESSURE SENSOR WITH MONOLITHIC BODY AND CIRCUIT-BEARING MEMBRANE ATTACHED THERETO

(75) Inventor: Frank Dietrich, Ostfildern Kemnat (DE)

(73) Assignee: Metallux AG, Korb (DE)

( * ) Notice: Subject to any disclaimer, the term of this patent is extended or adjusted under 35 U.S.C. 154(b) by 6 days.

(21) Appl. No.: 11/122,693

(22) Filed: May 5, 2005

(65) Prior Publication Data
US 2005/0252301 A1    Nov. 17, 2005

(30) Foreign Application Priority Data
Nov. 6, 2002    (DE) ................. 102 52 023

(51) Int. Cl.
*G01L 9/06*    (2006.01)
(52) U.S. Cl. ................ 73/721; 73/715; 73/754
(58) Field of Classification Search .......... 73/700–756; 361/283.1–283.4
See application file for complete search history.

(56) References Cited

U.S. PATENT DOCUMENTS

| | | | |
|---|---|---|---|
| 5,349,746 A * | 9/1994 | Gruenwald et al. ........... 29/620 |
| 5,391,844 A | 2/1995 | Johnson et al. |
| 5,915,281 A | 6/1999 | Sparks |
| 5,945,605 A * | 8/1999 | Julian et al. .................. 73/727 |
| 6,716,036 B1 * | 4/2004 | Gandhi ........................ 439/65 |
| 6,845,664 B1 * | 1/2005 | Okojie ........................ 73/431 |
| 2002/0121145 A1 | 9/2002 | DeConde et al. |

FOREIGN PATENT DOCUMENTS

| | | |
|---|---|---|
| DE | 3877170 T2 | 6/1989 |
| DE | 4211993 A1 | 9/1993 |
| DE | 19645613 A1 | 9/1997 |
| DE | 1985907 C2 | 7/2000 |
| EP | 0321225 A2 | 6/1989 |

OTHER PUBLICATIONS

Chunyan Li et al, Polymer flip-chip bonding of pressure sensors on a flexible Kapton film for neonatal catheters, Jul. 21, 2005, Abstract.*
Papakostas, Polymer Thick-Films on Silicon: A Route to Hybrid Microsystems, 2001, Abstract.*
Metallux.de, Keramischer Drucksensor (ceramic pressure sensor), cps 1000/2000, German Brochure, Copyright Dec. 2003.

* cited by examiner

*Primary Examiner*—Edward Lefkowitz
*Assistant Examiner*—Jermaine Jenkins
(74) *Attorney, Agent, or Firm*—Emrich & Dithmar

(57) ABSTRACT

An absolute or relative pressure sensor formed of a monolithic plastic body (2) includes a carrier body (3) and a membrane (4). A printed circuit including wire strain gauges and comprised of a polymer paste is disposed on the membrane (4). The membrane (4) is shaped so as to be very soft affording high pressure sensitivity, while the circuit includes electric terminals (7) which may be embedded in the monolithic body (2) during manufacture to eliminate subsequent mounting of these terminals in simplifying production and reducing cost. By connecting the membrane (4) to an element embedded in the monolithic body (2), membrane elasticity may be adjusted to provide the pressure sensor with a desired sensitivity for a specific application. The embedded element is preferably formed as a core of the membrane which is completely surrounded by the plastic monolithic body (2) using a vacuum container (8).

30 Claims, 1 Drawing Sheet

Figure 1:
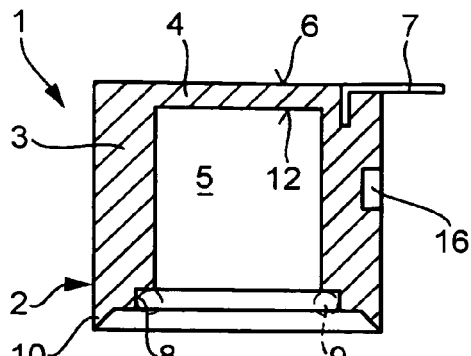

PRESSURE SENSOR WITH MONOLITHIC BODY AND CIRCUIT-BEARING MEMBRANE ATTACHED THERETO

The present invention relates to a pressure sensor having a monolithic body comprising a carrier body and a membrane on which a circuit is printed for determining either differential or absolute pressure.

Pressure sensors are used in many areas of technology, in particular in process engineering, for measurement of pressures in gaseous or liquid fluids.

A pressure sensor of the type defined above is described in the information sheet "Pressure Sensor of the PD 1000/2000 Series" from the company Metallux. This pressure sensor has a monolithic body comprising a ring-shaped carrier body and a membrane. A bridge circuit comprising wire strain gauges is printed on the membrane by means of the thick-film technology by the screen printing method. The wire strain gauges are made of a hardened conductive high-temperature paste. Such a high-temperature paste usually contains noble metals and is comparatively expensive. The monolithic body of the known pressure sensor is made of ceramic so the manufacturing costs of the monolithic body are comparatively high. This results in a reduction in the use spectrum of the pressure sensors because only comparatively expensive pressure sensors are economically feasible for many applications.

Such a pressure sensor is usually installed in a housing made of steel, for example, but at any rate not made of ceramic, so there are different temperature coefficients. To prevent stresses in the membrane due to thermal expansion effects, a complex mounting of the pressure sensor in the particular housing may therefore be necessary. With the known pressure sensor, the membrane is made of ceramic, which entails additional restrictions. First, the membrane may be designed to be relatively thin which makes the production complex. Therefore, there may be comparatively great fluctuations in membrane thickness due to tolerance, so that the overall temperature sensitivity of the pressure sensors is subject to great variation because the thickness of the membrane enters the spring characteristic line for the membrane with the third power. In addition, a ceramic membrane has a relatively great stiffness so that to implement a pressure sensor having a comparatively great sensitivity for sensing relatively low pressures, the membrane must have a large geometric size accordingly.

The present invention relates to the problem of providing an improved embodiment which can be manufactured inexpensively in particular for a pressure sensor of the type defined above.

This problem is solved according to this invention by the object of the independent claim. Advantageous embodiments are the object of the dependent claims.

This invention is based on the general idea of manufacturing the monolithic body from plastic and making the circuit components from a polymer paste. Mass production of a plastic monolith can be implemented very inexpensively. This invention is utilizing here the finding that a high thermal stability of the pressure sensor is not necessary for many applications. At comparatively low process temperatures, monolithic bodies having lifetimes sufficiently long for a corresponding high-temperature plastic can therefore be implemented. The use of a polymer paste to form the circuit components, in particular the wire strain gauges, permits hardening of the printed circuit at comparatively low temperatures, or at any rate at temperatures which can be withstood by the high-temperature plastic of the monolithic body. Therefore a low-temperature paste is expediently used as the polymer paste. In addition, a polymer paste with or without a comparatively low noble metal content may be used, and a price advantage can also be achieved here. This invention thus makes available a pressure sensor that can be manufactured extremely inexpensively for low-temperature applications.

In addition, through a suitable shaping it is possible to design the plastic membrane to be comparatively soft, so that a very high sensitivity for measurement of low pressures can be achieved with a small geometric size. In addition, shape tolerances can be reduced through the choice of a suitable manufacturing process so that fluctuations in the overall sensitivity of the particular pressure sensor are comparatively minor. Small manufacturing tolerances are obtained in particular when an injection molding process is used to manufacture the monolithic body.

In an advantageous refinement, the pressure sensor has electric terminals which are designed as insertion parts and are embedded in the monolithic body. In particular these terminals may already be integrated into the monolithic body at the time of its manufacture. Subsequent mounting of terminals on the printed circuit may therefore be eliminated, which greatly simplifies the production of such pressure sensors and allows them to be implemented less expensively.

An embodiment in which the membrane is motion-connected to a one-piece or multi-piece insertion or embedded element which is fixedly connected to the monolithic body is particularly advantageous. With the help of such an insertion or embedding element, the elasticity of the membrane can be influenced in a controlled manner. In particular it is possible in this way to design the wire expansion behavior of the membrane to the desired sensitivity and/or use form of the pressure sensor in a targeted manner with respect to sensitivity, etc.

In a preferred embodiment, this insert element or embedded element may be formed by a one-piece or multipart membrane core which is situated in the membrane and is completely surrounded by the plastic of the monolithic body. With this type of construction, the membrane body may be integrated into the membrane already at the time of manufacture of the monolithic body. Due to the fact that the membrane core is completely surrounded by the plastic of the monolithic body, materials, in particular metals, which are not suitable for printing with the circuit and/or which cannot be exposed unprotected to certain media in which the pressure is to be measured without protection (because otherwise there is the risk of corrosion, for example), may also be used for the membrane core. By integrating such a membrane core into the interior of the membrane, the spring characteristic of the membrane can be influenced and/or modeled in a targeted fashion through integration of such a membrane core into the interior of the membrane.

In another advantageous refinement, the inserted element or embedded element may be formed by a vacuum container which is situated in the membrane and is completely enclosed by the plastic of the monolithic body. Here again, the vacuum container is expediently incorporated into the membrane already during the manufacture of the monolithic body. The coupling of the membrane to a vacuum container permits the design of the pressure sensor as an absolute pressure sensor. It is especially advantageous here that such vacuum containers can be manufactured comparatively inexpensively and the vacuum introduced therein can be maintained for a sufficiently long period of time. Due to the tight sheathing of the vacuum container with the plastic of the monolithic body, this yields an additional sealing of the vacuum container. At the same time, the sheathing of the vacuum container with the plastic here again permits a free choice of the material of the vacuum container.

Other important features and advantages of this invention are derived from the subclaims, the drawings and the respective description of the figures with reference to the drawings.

It is self-evident that the features cited above and to be explained below may be used not only in the combination given here but also in other combinations or even alone without going beyond the scope of the present invention.

Preferred exemplary embodiments of this invention are depicted in the drawings and are explained in greater detail in the following description, where the same reference notation is used for the same or functionally identical or similar parts.

Figure 3:
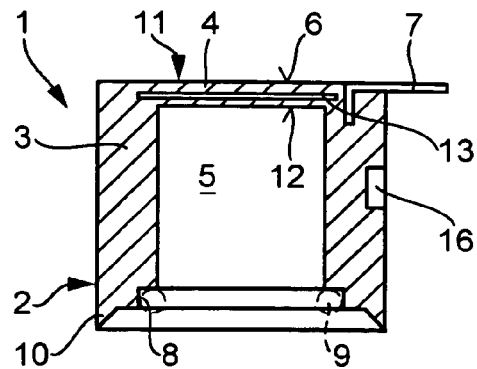
Figure 2:
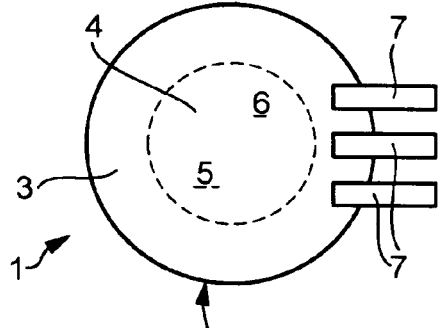
Figure 4:
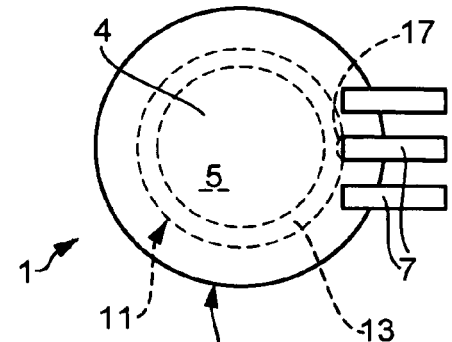
Figure 5:
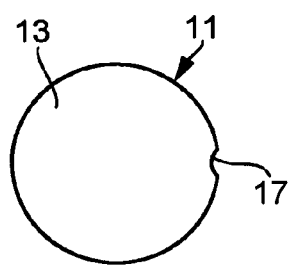
Figure 7:
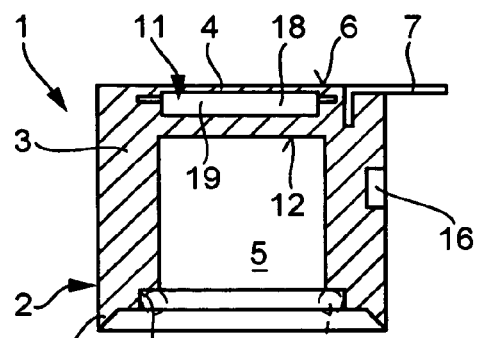
Figure 6:
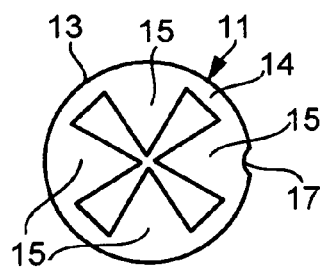
Figure 8:
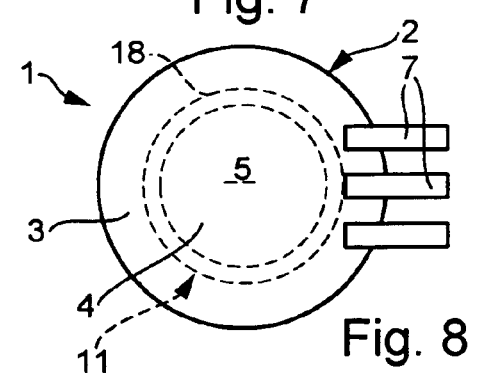

The drawings show, schematically in each case:

FIG. 1 a longitudinal section through a pressure sensor in a first embodiment,

FIG. 2 a top view of the pressure sensor according to FIG. 1,

FIG. 3 a longitudinal section like that in FIG. 1 but in a second embodiment,

FIG. 4 a top view like that in FIG. 2 but in the embodiment according to FIG. 3, FIG. 5 a top view of a membrane core, FIG. 6 a top view like that in FIG. 5 but in a different embodiment, FIG. 7 a longitudinal section like that in FIG. 1 but in a third embodiment, FIG. 8 a top view like that in FIG. 2, but in the embodiment according to FIG. 7.

According to FIGS. 1 through 8, an inventive pressure sensor 1 has a monolithic body 2, which is made of a plastic according to this invention, in particular a thermoplastic material, preferably a high-temperature plastic. The monolithic body 2 includes a carrier body 3 and a membrane 4 designed in one piece on the carrier body.

The carrier body 3 is designed here as a closed circular ring. Likewise other ring geometries, in particular angular ring geometries are also possible. The membrane 4 is designed at one axial end of the carrier body 3. Therefore a top side 6 of the membrane 4 facing away from an interior 5 of the carrier body 3 is especially suitable for printing a bridge circuit (not shown here) of wire strain gauges. According to this invention, a curable and conductive polymer paste, in particular with little or no noble metal content, is used to produce the wire strain gauges. The bridge circuit is preferably printed on the top side 6 of the membrane 4 by a screen printing method as part of the so-called thick-film technique. At the same time, the printed circuit may comprise a temperature compensation network. Such a bridge circuit usually includes four wire strain gauges, two of which are situated in traction zones and two in pressure zones of the membrane 4. The polymer paste used to form the wire strain gauges or other components, e.g., resistors of the circuit, is preferably a low-temperature paste.

The monolithic body 2 has electric terminals 7 at which signals generated by the printed circuit, for example, can be picked up. In addition, other terminals may be used, for example, to connect integrated circuits to the pressure sensor 1. The terminals then form so-called lead frames which supply one or more slots for integrated circuits. For example, the pressure sensor 1 may therefore be combined in a particularly convenient manner with at least one so-called ASIC [application-specific integrated circuit] which is essentially an integrated circuit defined by the particular user.

The monolithic body 2 is preferably designed as an injection-molded component so that it is especially simple to embed the terminals 7 in the monolithic body 2 by casting or injecting plastic around them. In this way the terminals 7 are integrated into the monolithic body 2 already at its manufacture.

The carrier body 3 in the embodiment shown here is equipped with a ring-shaped receiving groove 8 on its other end facing away from the membrane 4; a gasket 9, namely an O-ring here, can be inserted into this groove. Depending on the assembly situation, the gasket 9 may provide a radial and/or axial seal.

In addition, an axially protruding ring-shaped welding projection 10 is formed on the other axial end of the carrier body 3 facing away from the membrane 4 in the embodiment illustrated here. This welding lug 10 may be used in certain types of applications to weld the monolithic body 2 to a component that is to be equipped with the pressure sensor 1. An ultrasonic welding process in particular is suitable for this.

The membrane 4 may be designed with regard to its thickness and/or shape in a controlled manner so as to yield a desired spring elasticity. The spring elasticity of the membrane 4 determines the sensitivity of the pressure sensor 1 and the pressure range in which the pressure sensor 1 can be used.

On an underside 12 facing the interior 5, the membrane 4 is expediently acted upon by the medium whose pressure is to be measured with the help of the pressure sensor 1. In other words, the printed circuit does not usually have any contact with the medium in which the measurement is to be performed.

According to FIGS. 3 through 8, the membrane 4 may be motion-coupled to an insertion element or an embedded element 11, i.e., the membrane 4 follows the movements of the insertion element or embedded element 11. This insertion element or embedded element 11 may be designed in one or more parts.

With the help of this insertion or embedded element 11, the spring elastically and/or spring characteristic of the membrane 4 can be influenced. For example it is possible with the help of insertion element or embedded element 11 to weigh down the membrane 4 with an additional mass which may serve at the same time to stiffen the membrane 4.

In the embodiments depicted here, the insertion element or embedded element 11 is fixedly anchored in the carrier body 3. In addition, the insertion element or embedded element 11 has essentially the same cross-sectional area as the membrane 4. This design yields the result that the particular insertion or embedded element 11 used in each case also acts as a membrane, whereby the insertion element or embedded element 11 and the membrane 4 act like a single membrane via their motion coupling, having a resulting spring characteristic.

In the embodiment according to FIGS. 3 through 6, the insertion element or embedded element 11 is formed by a membrane core 13. The membrane core 13 is arranged in the membrane 4 in such a way that the plastic of the monolithic body 2 completely encloses the membrane core 13. Due to this design, the membrane core 13 is not exposed to the medium that is to be measured but instead is protected by the plastic of the monolithic body 2. In addition, the plastic of the monolithic body 2 is selected so that it is particularly suitable for printing with the polymer paste. Accordingly, a material that is not suitable for printing with the polymer paste may also be used for the membrane core 13. The membrane core 13 is preferably made of metal. Essentially, however, other materials which are suitable for influencing the elastically of the membrane 4 are also conceivable. A membrane core 13 made of metal is much stiffer than the plastic membrane 4, so the elastically of the membrane core 13 dominates the spring characteristic of the (resulting) membrane 4 of the pressure sensor 1.

According to FIG. 5, the membrane core 13 may be formed by a solid disk. The spring characteristic of the membrane 4 can be determined through the choice of material and wall thickness.

Essentially any desired suitable shape or form may be used for the membrane core 13 to model the spring characteristic of the membrane 4 in a desired manner. FIG. 6 shows as an example a particular embodiment of the membrane core 13. The membrane core 13 here shows a ring 14 with multiple tongues 15, namely four here, protruding radially inward. The tongues 15 do not come in contact with one another in order to have a greater mobility.

It is obvious due to the variants of FIGS. 5 and 6 which are shown as examples that the spring property of the membrane 4 and thus the sensitivity of the pressure sensor 1 and/or the use pressure range of the pressure sensor 1 can be modeled in virtually any way by designing the membrane core 13 and/or the insertion element or embedded element 11 with regard to at least one of the following criteria in particular: form, material, elastically and dimensioning.

The monolithic body 2 has an indexing 16 in the form of a recess here in the area of its carrier body 3. Such an indexing 16 simplifies mass production of the pressure sensor 1 because the particular relative position of the monolithic body 2 which is otherwise rotationally symmetrical can always be recognized by the indexing 16 and/or adjusted by machine.

As shown in FIGS. 4 through 6, the membrane core 13 may expediently also be equipped with indexing 17 in the form of a recess.

The exemplary embodiments in FIGS. 1 through 6 illustrate a pressure sensor 1 which can be used as a differential pressure sensor. This means that the pressure sensor 1 can always determine only a pressure difference between the top side 6 and the bottom side 12 of the membrane 4. The pressure sensor 1 must then also be installed accordingly.

In contrast with that, FIGS. 7 and 8 illustrate an embodiment in which the pressure sensor 1 is designed as an absolute pressure sensor. To this end the insertion element or embedded element 11 is formed by a vacuum container 18. This vacuum container 18 is manufactured in the traditional way and has a vacuum in its interior 19 and can maintain this for a sufficiently long period of time. For example such a vacuum container 18 can be produced by laser welding to tightly join two half-shells under a vacuum, in particular.

If the pressure sensor 1 according to FIG. 7 is installed so that the medium to be measured acts upon the top side 6 as well as the bottom side 12 of the membrane 4, then the membrane 4 is always deformed as a function of the pressure difference between the pressure applied to the top side 6 and the bottom side 12 and the vacuum of the vacuum container 18, i.e., as a function of the absolute pressure.

The vacuum container 18 is also preferably integrated into the membrane 4 in such a way that it is completely enclosed by the plastic of the monolithic body 2. Accordingly, here the material of the vacuum container 18 is also protected from attack by the particular medium whose pressure is to be measured. In addition, the printing of the circuit on the membrane 4 is also simplified.

The pressure sensor 1 may also be formed in relation to the absolute pressure sensor by the fact that the interior 5 of the monolithic body 2 is sealed in vacuo on the end of the carrier body 3 which faces away from the membrane 4, namely being sealed by a cover which is welded over the welding lug 10, for example.

A circuit (not shown here) is printed on the membrane 4 by the thick-film technique, e.g., by a screen-printing method, this circuit being suitable for determining the pressure acting on the membrane 4. Individual components of the circuit are applied from a curable paste which is hardened in a subsequent operation. According to this invention this is a polymer paste. The circuit is expediently a bridge circuit comprised of wire strain gauges made of the polymer paste mentioned above.

In particular when the monolithic body 2 is designed as an injection-molded component, integration of the membrane core 13 and/or the vacuum container 18 may be implemented in a particularly simple manner by injecting or casting plastic material around the respective insert or embedded element 11 in injection molding or casting of the monolithic body.

The invention claimed is:

1. A pressure sensor having a monolithic body (2) comprising a carrier body (3) and a membrane (4) on which a circuit is printed for determining the pressure, wherein
   components of the circuit are manufactured from a cured paste,
   the monolithic body (2) is made of plastic,
   the paste is a polymer paste,
   the membrane is motion-connected to a one-piece or multipart insertion or embedded element which is fixedly connected to the monolithic body.

2. The pressure sensor according to claim 1, wherein the monolithic body (2) is comprised of a thermoplastic material.

3. The pressure sensor according to claim 1, wherein the monolithic body (2) is an injection-molded component.

4. The pressure sensor according to claim 1, wherein the monolithic body (2) is made of a high-temperature plastic.

5. The pressure sensor according to claim 1, wherein the polymer paste is a low-temperature paste.

6. The pressure sensor according to claim 1, wherein the pressure sensor (1) has electric terminals (7) which are designed as insertion parts or embedded parts and are embedded in the monolithic body (2).

7. The pressure sensor according to claim 6, wherein the electric terminals (7) are embedded in the monolithic body (2) by injecting or casting plastic around them.

8. The pressure sensor according to claim 1, wherein the insertion element or embedded element 11 is selected with regard to the shape and/or material and/or elastically and/or dimensioning as a function of the spring property of the membrane which is required for the intended application of the sensor.

9. The pressure sensor according to claim 1, wherein the insertion element or embedded element (11) is formed by a one-piece or multipart membrane core which is disposed in the membrane and is completely surrounded by the plastic of the monolithic body.

10. The pressure sensor according to claim 9, wherein the membrane core (13) is made of metal.

11. The pressure sensor according to claim 9, wherein the membrane core (13) is a solid disk.

12. The pressure sensor according to claim 9, wherein the membrane core (13) is designed as a ring with at least one tongue extending radially inward from it.

13. The pressure sensor according to claim 9, wherein the membrane core (13) or the vacuum container (18) is embedded in the monolithic body (2) by injecting or casting plastic around it.

14. The pressure sensor according to claim 1, wherein the insertion element or embedded element (11) is formed by a vacuum container.

15. The pressure sensor according to claim 14, wherein the vacuum container is disposed in the membrane and is completely surrounded by the plastic of the monolithic body.

16. The pressure sensor according to claim 14, wherein the pressure sensor is an absolute pressure sensor.

17. A pressure sensor having a monolithic body comprising a carrier body and a membrane on which a circuit is printed for determining the pressure, wherein components of the circuit are manufactured from a cured paste, the monolithic body is made of plastic, the paste is a polymer paste, the carrier body forms a closed ring on which the membrane is formed at one end and a ring-shaped receiving groove for a gasket acting axially and/or radially and/or a ring-shaped welding projection protruding axially is formed on the other end.

18. The pressure sensor according to claim 17, wherein the monolithic body is comprised of a thermoplastic material.

19. The pressure sensor according to claim 17, wherein the monolithic body is an injection-molded component.

20. The pressure sensor according to claim 17, wherein the monolithic body is made of a high-temperature plastic.

21. The pressure sensor according to claim 17, wherein the polymer paste is a low-temperature paste.

22. The pressure sensor according to claim 17, wherein the pressure sensor has electric terminals which are designed as insertion parts or embedded parts and are embedded in the monolithic body.

23. The pressure sensor according to claim 22, wherein the electric terminals are embedded in the monolithic body by injecting or casting plastic around them.

24. A pressure sensor having a monolithic body comprising a carrier body and a membrane on which a circuit is printed for determining the pressure, wherein components of the circuit are manufactured from a cured paste, the monolithic body is made of plastic, the paste is a polymer paste, the circuit for determining the pressure is a circuit of wire strain gauges, the wire strain gauges being made of the polymer paste.

25. The pressure sensor according to claim 24, wherein the monolithic body is comprised of a thermoplastic material.

26. The pressure sensor according to claim 24, wherein the monolithic body is an injection-molded component.

27. The pressure sensor according to claim 24, wherein the monolithic body is made of a high-temperature plastic.

28. The pressure sensor according to claim 24, wherein the polymer paste is a low-temperature paste.

29. The pressure sensor according to claim 24, wherein the pressure sensor has electric terminals which are designed as insertion parts or embedded parts and are embedded in the monolithic body.

30. The pressure sensor according to claim 29, wherein the electric terminals are embedded in the monolithic body by injecting or casting plastic around them.

* * * * *

UNITED STATES PATENT AND TRADEMARK OFFICE
CERTIFICATE OF CORRECTION

PATENT NO. : 7,162,925 B2
APPLICATION NO. : 11/122693
DATED : January 16, 2007
INVENTOR(S) : Frank Dietrich It is certified that error appears in the above-identified patent and that said Letters Patent is hereby corrected as shown below:

In the claims:

Claim 13, Column 7, Line 1: Delete: "The pressure sensor according to claim 9, wherein the membrane core (13) or the vacuum container (18) is embedded in the monolithic body (2) by injecting or casting plastic around it."

Replace with --The pressure sensor according to claim 1, wherein the insertion element or embedded element (11) is formed by a vacuum container.--

Claim 14, Column 7, line 5: Delete: "The pressure sensor according to claim 1, wherein the insertion element or embedded element (11) is formed by a vacuum container."

Replace with --The pressure sensor according to claim 13, wherein the vacuum container is disposed in the membrane and is completely surrounded by the plastic of the monolithic body.--

Claim 15, Column 7, line 8: Delete: "The pressure sensor according to claim 14, wherein the vacuum container is disposed in the membrane and is completely surrounded by the plastic of the monolithic body."

Replace with --The pressure sensor according to claim 13, wherein the pressure sensor is an absolute pressure sensor.--

UNITED STATES PATENT AND TRADEMARK OFFICE
CERTIFICATE OF CORRECTION

PATENT NO. : 7,162,925 B2
APPLICATION NO. : 11/122693
DATED : January 16, 2007
INVENTOR(S) : Frank Dietrich It is certified that error appears in the above-identified patent and that said Letters Patent is hereby corrected as shown below:

In the claims:

Claim 16, Column 7, Line 11: Delete: "The pressure sensor according to claim 14, wherein the pressure sensor is an absolute pressure sensor."

Replace with --The pressure sensor according to claim 9, wherein the membrane core (13) or the vacuum container (18) is embedded in the monolithic body (2) by injecting or casting plastic around it.--

Signed and Sealed this

Tenth Day of April, 2007

JON W. DUDAS
*Director of the United States Patent and Trademark Office*